(12) United States Patent
Hopperstad

(10) Patent No.: US 8,605,551 B2
(45) Date of Patent: Dec. 10, 2013

(54) POSITION DETERMINATION OF A SEISMIC SOURCE ARRAY

(75) Inventor: Jon-Fredrik Hopperstad, Cambridge (GB)

(73) Assignee: WesternGeco L.L.C., Houston, TX (US)

(*) Notice: Subject to any disclaimer, the term of this patent is extended or adjusted under 35 U.S.C. 154(b) by 427 days.

(21) Appl. No.: 12/988,873

(22) PCT Filed: May 12, 2009

(86) PCT No.: PCT/GB2009/001165
§ 371 (c)(1),
(2), (4) Date: Jan. 24, 2011

(87) PCT Pub. No.: WO2009/150396
PCT Pub. Date: Dec. 17, 2009

(65) Prior Publication Data
US 2011/0122725 A1 May 26, 2011

(30) Foreign Application Priority Data
Jun. 13, 2008 (GB) .................................. 0810828.4

(51) Int. Cl.
*G01S 15/00* (2006.01)
*G01S 3/80* (2006.01)
(52) U.S. Cl.
USPC .............................. 367/99; 367/118; 367/130
(58) Field of Classification Search
USPC ........................ 367/19, 144, 23; 181/111, 113
See application file for complete search history.

(56) References Cited

U.S. PATENT DOCUMENTS

| 4,476,553 A | 10/1984 | Ziolkowski et al. |
| 4,658,384 A * | 4/1987 | Dragoset et al. ................ 367/23 |

(Continued)

FOREIGN PATENT DOCUMENTS

| GB | 2320327 A | 6/1998 |
| GB | 2433594 A | 6/2007 |
| GB | 2436699 A | 10/2007 |

OTHER PUBLICATIONS

Landrø: "Source signature determination by inversion of ministreamer data", The Leading Edge, Jan. 2000, pp. 46-49.

(Continued)

*Primary Examiner* — Isam Alsomiri
*Assistant Examiner* — Hovhannes Baghdasaryan

(57) ABSTRACT

A method of obtaining information about the positions of sources in a marine seismic source array, comprises: determining respective notional signatures for m selected seismic sources, where m<n, where n is the number of sources of the array actuated to generate an output; and obtaining information about the travel between one of the m selected seismic sources and one of the n−m unselected seismic sources from the determined notional signatures. The m seismic sources are selected as sources whose positions, relative to one another, are expected to be close to their nominal positions. The effect of the n−m unselected seismic sources is ignored in the calculation of the nominal signatures for the m sources, and this gives rise to anomalies in the nominal signatures for the m sources. The determined travel time may be converted to a distance, so that information about the positions of the n−m unselected seismic sources may be obtained from the anomalies. Alternatively, the nominal signatures calculated for the m sources may be compared with notional signatures calculated for an estimate of the actual positions of the sources. The invention allows information about the actual geometry of the source array to be obtained from near-field measurements, so avoiding the need for a separate position-determining means.

16 Claims, 8 Drawing Sheets

(56) References Cited

U.S. PATENT DOCUMENTS

| | | | |
|---|---|---|---|
| 6,018,494 | A | 1/2000 | Laws |
| 6,788,618 | B2* | 9/2004 | Clayton et al. ............... 367/13 |
| 7,376,045 | B2* | 5/2008 | Falkenberg et al. ............ 367/19 |
| 8,004,930 | B2 | 8/2011 | Welker et al. |
| 2005/0259513 | A1 | 11/2005 | Parkes |
| 2007/0230268 | A1 | 10/2007 | Hoogeveen et al. |
| 2009/0231953 | A1 | 9/2009 | Welker et al. |
| 2011/0122724 | A1 | 5/2011 | Hopperstad |

OTHER PUBLICATIONS

Laws et al: "An experimental comparison of three direct methods of marine source signature estimation", Geophysical Prospecting, vol. 46, 1998, pp. 353-389.

Parkes et al: "The signature of an air gun array: Computation from near-field measurements including interactions—Practical considerations", Geophysics, vol. 48, No. 2, 1984, pp. 105-111.

Vaage et al: "Interaction between airguns", Geophysical Prospecting, vol. 32, 1984, pp. 676-689.

Ziolkowski et al: "The signature of an air gun array: Computation from near-field measurements including interactions", Geophysics, vol. 47, No. 10, 1982, pp. 1413-1421.

Combined Search and Examination Report of British Application No. GB 0810828.4 dated Oct. 8, 2008.

Combined Search and Examination Report of British Application No. GB 0810882.1 dated Oct. 6, 2008.

International Search Report of PCT Application No. PCT/GB2009/001165 dated Nov. 26, 2010.

International Search Report of PCT Application No. PCT/GB2009/001164 dated Sep. 23, 2009.

* cited by examiner

NEAR-FIELD
6

7

FAR-FIELD 8

POSITION DETERMINATION OF A SEISMIC SOURCE ARRAY

The present invention relates to seismic surveying. In particular, it relates to a method of and system for determining the positions of seismic sources in a seismic source array.

The general principle of seismic surveying is that one or more sources of seismic energy are caused to emit seismic energy such that it propagates downwardly through the earth. The downwardly-propagating seismic energy is reflected by one or more geological structures within the earth that act as partial reflectors of seismic energy. The reflected seismic energy is detected by one or more sensors (generally referred to as "receivers"). It is possible to obtain information about the geological structure of the earth from seismic energy that undergoes reflection within the earth and is subsequently acquired at the receivers.

A typical seismic survey uses a source array containing two or more seismic sources. When a source array is actuated to emit seismic energy it emits seismic energy over a defined period of time. The emitted seismic energy from a seismic source array is not at a single frequency but contains components over a range of frequencies. The amplitude of the emitted seismic energy is not constant over the emitted frequency range, but is frequency dependent. The seismic wavefield emitted by a seismic source array is known as the "signature" of the source array. When seismic data are processed, knowledge of the signature of the seismic source array used is desirable, since this allows more accurate identification of events in the seismic data that arise from geological structures within the earth. In simple mathematical terms, the seismic wavefield acquired at a receiver represent the effect of applying a model representing the earth's structure to the seismic wavefield emitted by the source array; the more accurate is the knowledge of the source array signature, the more accurately the earth model may be recovered from the acquired seismic data.

It has been suggested that one or more sensors may be positioned close to a seismic source, in order to record the source signature. By positioning the sensor(s) close to the seismic source the wavefield acquired by the sensor(s) should be a reliable measurement of the emitted source wavefield. WesternGeco's™ Trisor/CMS system provides estimates of the source wavefield from measurements with near-field hydrophones near each of the seismic sources composing the source arrays in marine seismic surveys.

FIG. 1(a) is a schematic perspective view of a marine seismic source array having 18 airgun positions A1 . . . A18 (for clarity, not all airgun positions are labelled). In use, an airgun or a cluster of two or more airguns is located at each airgun position—FIG. 1 shows, for illustration, a single airgun 1 at each of airgun locations A2 to A6, A8 to A12 and A14 to A18 and a cluster 2 of three airguns at positions A1, A7 and A13. A near-field hydrophone is located above each airgun position to record the emitted wavefield—hydrophones H1 to H6 located above airgun positions A1 to A6 are labelled in FIG. 1(b), which is a side view of one sub-array.

FIG. 1(a) illustrates a further feature of seismic source arrays, which is that they are often comprised of two or more sub-arrays. The source array shown in FIG. 1(a) comprises three identical sub-arrays, with airgun positions A1-A6 constituting one sub-array, airgun positions A7-A12 constituting a second sub-array and airgun positions A13-A18 constituting a third sub-array. The sources of a sub-array are suspended from a respective surface float F1, F2, F3. Each sub-array is towed from a seismic vessel using a high-pressure gun-cable (not shown), which supplies the sub-array with high-pressure air for the airguns. The gun-cable may also have optical fibres and power lines for the in-sea electronics in the source array.

The signature of a seismic source array is generally directional, even though the individual sources may behave as "point sources" that emit a wavefield that is spherically symmetrical. This is a consequence of the seismic source array generally having dimensions that are comparable to the wavelength of sound generated by the array.

The signature of a seismic source array further varies with distance from the array. This is described with reference to FIG. 2. An array of sources 3, in this example a marine source array positioned at a shallow depth below a water-surface 4, emits seismic energy denoted as arrows 5. In FIG. 2 a "near field" region 6 is shown bounded by a boundary 7 with a "far field" region 8 on the other side of the boundary. In the near field region 6 the shape of the near field signature from the array of seismic sources varies with distance from the array. At the notional boundary 7, however, the signature of the array may assume a stable form. In the far-field region 8, the far-field signature of the array maintains a constant shape, and the amplitude of the signature decreases at a rate that is inversely proportional to the distance from the source array. The notional boundary 7 separating the near field region 6 from the far-field region 8 is located at a distance from the source array approximately given by $D^2/\lambda$, where D is the dimension of the array and $\lambda$ is the wavelength.

In processing geophysical data, knowledge of the far-field signature of the source array is desirable, since most geological features of interest are located in the far-field region 8. Direct measurement of the far-field signature of the array is difficult, however, owing to the need to ensure that no reflected energy is received during measurement of the far-field signature.

The near-field signature of an individual seismic source may in principle be measured, for example in laboratory tests or in field experiments. However, knowledge of the source signatures of individual seismic sources is not sufficient to enable the far-field signature of a source array to be determined, since the sources of an array do not behave independently from one another.

Interactions between the individual sources of a seismic source array were considered in U.S. Pat. No. 4,476,553. The analysis specifically considered airguns, which are the most common seismic source used in marine surveying, although the principles apply to all marine seismic sources. An airgun has a chamber which, in use, is charged with air at a high pressure and is then opened. The escaping air generates a bubble which rapidly expands and then oscillates in size, with the oscillating bubble acting as a generator of a seismic wave. In the model of operation of a single airgun it is assumed that the hydrostatic pressure of the water surrounding the bubble is constant, and this is a reasonable assumption since the movement of the bubble towards the surface of the water is very slow. If a second airgun is discharged in the vicinity of a first airgun, however, it can no longer be assumed that the pressure surrounding the bubble generated by the first airgun is constant since the bubble generated by the first airgun will experience a seismic wave generated by the second airgun (and vice versa).

U.S. Pat. No. 4,476,553 proposed that, in the case of seismic source array containing two or more seismic sources, each seismic source could be represented by a notional near-field signature. In the example above of an array of two airguns, the pressure variations caused by the second airgun is absorbed into the notional signature of the first airgun, and vice versa, and the two airguns may be represented as two independent airguns having their respective notional signatures. The far field signature of the array may then be found, at any desired point, from the notional signatures of the two airguns.

In general terms U.S. Pat. No. 4,476,553, the contents of which are hereby incorporated by reference, discloses a method for calculating the respective notional signatures for the individual seismic sources in an array of n sources, from measurements of the near-field wavefield made at n independent locations. When applied to the source array of FIG. 1, for example, measurements of the near field wavefield at each of the 18 hydrophone locations would allow the notional signatures for the 18 sources/clusters located at airgun positions A1 to A18 to be determined. The required inputs for the method of U.S. Pat. No. 4,476,553 are:

measurements of the near-field wavefield at n independent locations;

the sensitivities of the n near-field sensors used to obtain the n measurements of the near-field wavefield; and the (relative) positions of the n sources and the n near-field sensors.

For the simple source array containing two seismic sources 9,10 shown in FIG. 3, notional signatures for the two sources may be calculated according to the method of U.S. Pat. No. 4,476,553 from measurements made by near-field sensors 11,12 at two independent location from the distances $a_{11}$, $a_{12}$ between the location of the first near-field measuring sensor 12 and the seismic sources 9, 10, from the distances $a_{21}$, $a_{22}$ between the location of the second near-field sensor 11 and the seismic sources 9, 10, and from the sensitivities of the two near-field sensors. (In some source arrays the near-field sensors are rigidly mounted with respect to their respective sources, so that the distances $a_{11}$ and $a_{22}$ are known.) Once the notional signatures have been calculated, they may be used to determine the signature of the source array at a third location 12, provided that the distances $a_{31}$, $a_{32}$ between the third location and the seismic sources 9, 10 are known.

If a source array is not rigid it is necessary to obtain information about the positions of the seismic sources within the array before the method of U.S. Pat. No. 4,476,553 may be used. (For example, if the source array of FIG. 3 is not rigid the distances $a_{12}$, $a_{21}$ are not fixed and so must be determined.) This may be done by providing an external system for monitoring the positions of the sources in an array, for example by mounting Global Positioning System ("GPS") receivers on the source floats and placing depth sensors on the sources. FIG. 1(a) shows two GPS antennas G on each surface float F1-F3. This is not completely satisfactory however, as a failure of a GPS receiver or depth sensor will lead to the loss of position information making it impossible to apply the method of U.S. Pat. No. 4,476,553, so leading to interruption of the survey until a repair or replacement can be effected.

Determination of a notional source according to the method of U.S. Pat. No. 4,476,553 ignores the effect of any component of the wavefield reflected from the sea bed and so is limited to application in deep water seismography. The method of U.S. Pat. No. 4,476,553 has been extended in GB Patent No 2 433 594 to use "virtual sources" so as to take account of reflections at the sea-surface or at the sea bottom.

In principle it is possible to use the near-field sensors to obtain information about the position of the seismic sources and receivers. For example, information about the positions of the sources of one sub-array of the source array of FIG. 1 relative to the sources of another sub-array may be obtained by determining the time between actuation of a seismic source of one sub-array and the first arrival (or "first break") of seismic energy at a near-field sensor on another sub-array. When multiple airguns fire simultaneously or substantially simultaneously it is however very difficult to identify the contributions from different sources in the wavefield measured at a near-field sensor, since airgun signatures are far from orthogonal, and the prior art has been limited to firing one airgun at the time (also known as "single pops") and estimating the propagation time from first break detection. Consequently, the prior art has been limited to sequential firing of the airguns in the array such that, at any time, a near-field sensor senses energy from only one source or using an external position–monitoring system.

A first aspect of the present invention provides a method of obtaining information about the positions of sources in a marine seismic source array, the method comprising: determining respective notional signatures for m selected seismic sources, where m<n, where n is the number of sources of the array actuated to generate an output; and obtaining information about the travel time between one of the m selected seismic sources and one of the n−m unselected seismic sources from the determined notional signatures.

The invention is based on the premise that, when the positions of individual sources in a seismic source array are perturbed from their nominal positions, for example by the action of mechanical steering, tide, waves, wind or current (in the case of a marine seismic source array), in many case it is likely that the positions of a subset of the sources, measured relative to the other sources in the subset, will remain close to their nominal positions. In the case of the array of FIG. 1(a), for example, even if the position and/or orientation of one sub-array, relative to the other sub-arrays, may be perturbed significantly, it is likely that the relative positions of the sources, and their associated near-field hydrophones, in one of the sub-arrays will still be close to their nominal positions within that sub-array. If notional signatures are calculated for a subset of m sources which are expected to remain close to their nominal positions, using the m values of the wavefield measured by the near-field sensors associated with the m sources, these calculated notional signatures will be incorrect—since the calculation of the notional signatures for the m sources ignored the fact that the near-field sensors associated with the m sources in the subset will have sensed wavefields emitted by the other n−m sources of the array that do not belong to the subset as well as sensing the wavefields emitted by the m sources of the subset. The determined notional signatures are therefore likely to contain anomalies, arising from the wavefields emitted by the other n−m sources of the array that do not belong to the subset. These anomalies may be used to obtain information about the travel time from the m sources to one or more of the n−m sources of the array that do not belong to the subset, since the time at which the anomalies occur is indicative of the travel time of seismic energy from one or more of the n−m sources of the array that do not belong to the subset. The travel time may be converted to a distance by multiplying the travel time by the velocity of propagation of sound in water (which is known).

A second aspect of the invention provides a method of obtaining information about the positions of sources in a marine seismic source array, the method comprising: determining respective notional signatures for m selected seismic sources, where m<n, where n is the number of sources of the array actuated to generate an output; and obtaining information about the position of one of the m selected seismic sources relative to the position of one of the n−m unselected seismic sources from the determined notional signatures. In this aspect information about the positions of the sources is obtained directly, for example by comparing the notional signatures with notional signatures modelled for a variety of different array geometries and selecting the array geometry that gives the modelled notional signature that is the closest match.

The invention thus enables the positions of the sources of the array to be determined without need for an external position measurement system. The invention may be applied in the case of simultaneous or near-simultaneous actuation of the sources of the array, thereby overcoming the limitation to sequential actuation of the sources required by prior art methods.

The present invention may also be used for a source array that is provided with an external position determination system; this allows the position information obtained by the invention to be combined with the position information from the external position determination system, such that the combined position information gives increased accuracy than either method by itself. For example, the invention may be applied with a source array having an acoustical positioning system, for example the IRMA acoustical positioning system of WesternGeco™, deployed on the source array, either alone or together with a Global Positioning System provided on the source floats. As a further example an inclinometer may be combined with GPS and depth sensors to estimate the relative position between the surface positions of the source floats as measured by GPS and the position of the airgun/hydrophone assembly suspended from each float, as described more fully in U.S. patent application Ser. No. 12/049,923. The information from the acoustical positioning system, from the GPS and from the method of the invention may all be combined to provide an estimate of the source array geometry. As well as allowing a more accurate estimate of the source geometry to be obtained, if the external position determination system should fail for a limited time or short time the survey may be continued using just the position information obtained from the method of the invention.

The method may further comprise generating an output at n sources of the array; and measuring the pressure field at n independent locations; and calculating the notional signatures for the m sources may comprise calculating the notional signatures from the pressure field measured at m of the independent locations, each location being associated with one of the m sources.

The notional signatures may, for example, be calculated according to the method of U.S. Pat. No. 4,476,553 or GB Patent No. 2 433 594.

Obtaining information about the distance between one of the m selected seismic sources and one of the n−m unselected seismic sources from the determined notional signatures may comprise identifying an anomalous feature in the notional signature of one of the m seismic sources. It may comprise determining the time interval between generating the output and the anomalous feature. Alternatively, it may comprise applying a correction for synchronisation errors and/or for the effects of superposition of wavefields from two or more of the n−m unselected seismic sources in the anomalous feature.

As explained above, anomalies in the determined notional signatures for the m sources of the subset are most likely to arise from the wavefield emitted by the other n−m sources of the array that do not belong to the subset. The time at which an anomaly occurs is indicative of the travel time of seismic energy from one or more of the n−m sources of the array that do not belong to the subset to the source for which the notional signature has been calculated.

Other features of embodiments of the present invention are set out in the dependent claims.

Other aspects of the invention provide a corresponding computer-readable medium and apparatus.

Certain embodiments of the present invention will be described by way of illustrative example, with reference to the accompanying figures in which.

Figure 1A:
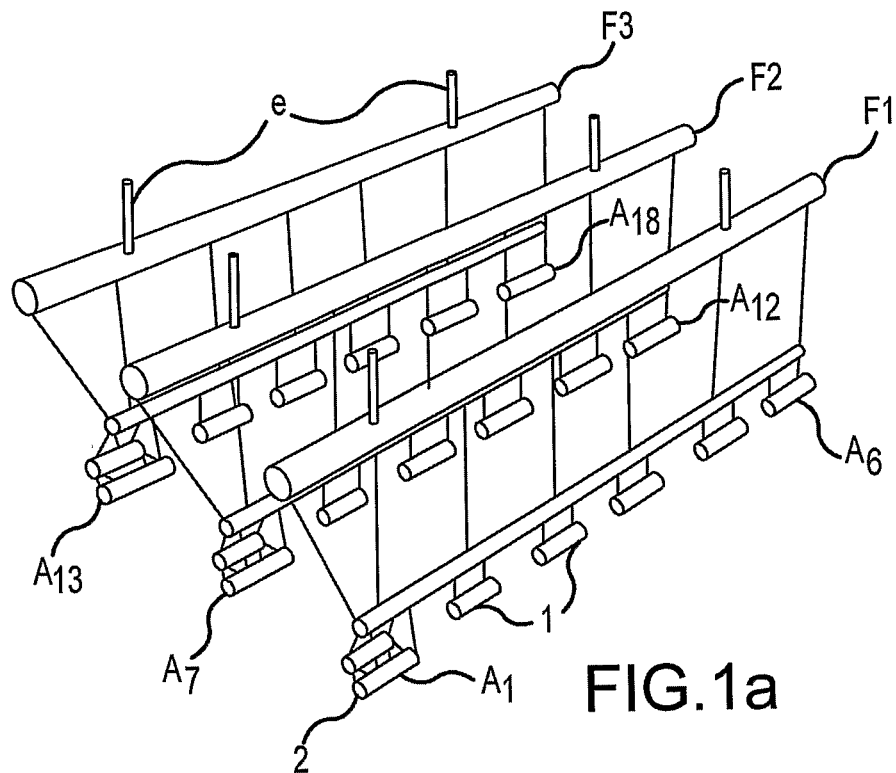
FIG. 1(a) is a schematic view of a marine seismic source array having three sub-arrays.
Figure 1B:
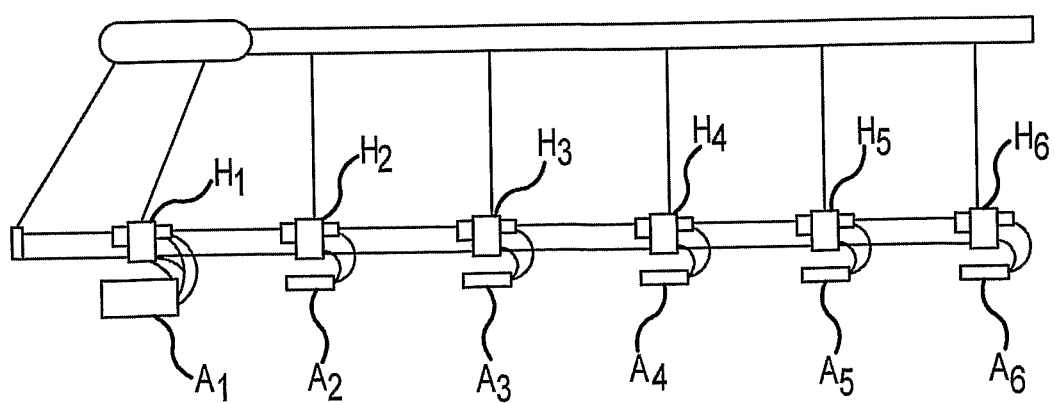
FIG. 1(b) is a side view of one sub-array of the marine seismic source array of FIG. 1(a)
Figure 2:
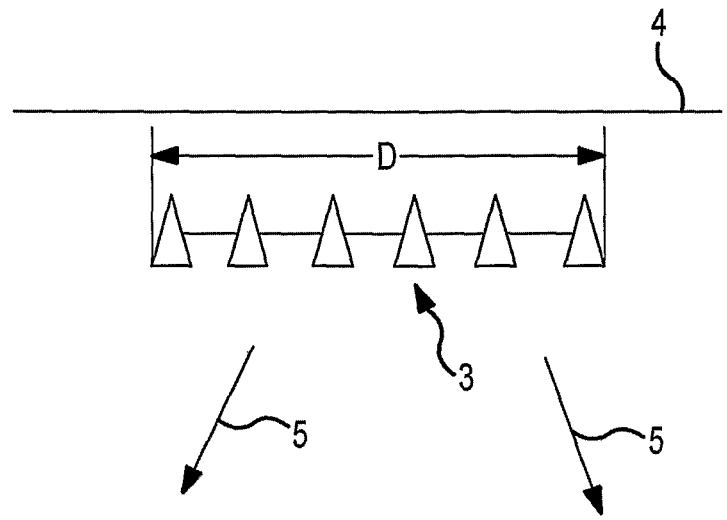
FIG. 2 illustrates propagation of a signature from an array of seismic sources.
Figure 5:
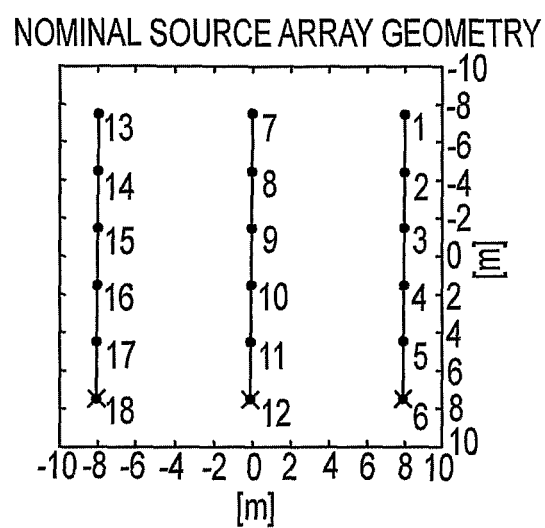
FIG. 5 is a schematic plan view showing nominal positions of the seismic sources of the array of FIG. 4(a)

In the above Figures, FIG. 5 is a plan view showing the nominal positions (that is, the intended positions) of the sources of the seismic source array shown in FIG. 1(a). As can be seen, it is intended that the three sub-arrays should be parallel to one another and level with one another, with the spacing between any two neighbouring sub-arrays being the same. The array is towed in a direction parallel to the length of the sub-arrays.

Figure 4A:
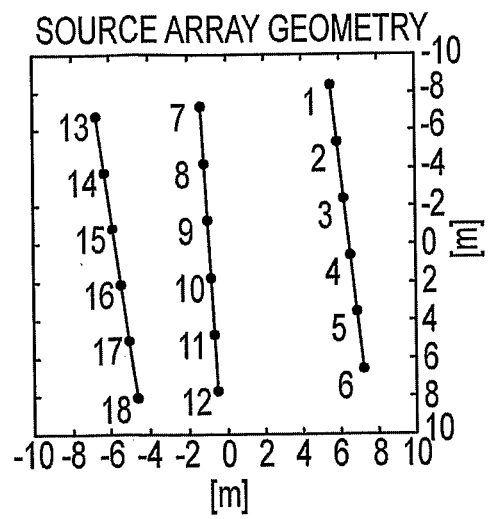
FIG. 4(a) is a schematic plan view of an array of seismic sources showing actual positions of the seismic sources.

In a typical seismic survey, however, the positions of the sub-arrays is perturbed owing to the action of, for example, mechanical steering, waves, tide, wind or currents in the case of a marine survey, so that the actual positions of the sources differ from their nominal positions. FIG. 4(a) show a typical example of the actual positions of the seismic sources of the seismic source array shown in FIG. 1(a) as might occur when the source array is deployed. As can be seen, the sub-arrays are no longer parallel to one another, the sub-arrays are not level with one another, and the spacing between neighbouring sub-arrays differs. If it is desired to calculate the notional signatures of the seismic sources (for example according to the method of U.S. Pat. No. 4,476,553 or GB Patent No. 2 433 594), to enable the far-field signature of the array to be estimated, it is therefore not safe to assume that the seismic sources are positioned at their notional positions and it is necessary to estimate the actual positions of the seismic sources. As explained above, this has hitherto been done by providing an external measuring system.

The invention assumes that it is likely that the positions of a subset of the sources, relative to the other sources in the subset, will remain close to their nominal positions. In the case of the array of FIG. 1(a), for example, while the position and/or orientation of one sub-array, relative to the other sub-arrays, may be perturbed significantly, it is likely that the relative positions of the sources and their associated near-field hydrophones in one of the sub-arrays will be close to their nominal positions. As can be seen in FIG. 4(a), the relative location of the source positions A1-6, A7-12 or A13-18 within one of the sub-arrays are close to their nominal positions, and the significant perturbations in the positions of the sources are between one array and another.

In the method of the invention, n sources of a source array are simultaneously actuated to generate an output, and the method comprises calculating notional signatures for a subset of m sources of the array (m<n) for which it is a good assumption that the relative positions of the sources is close to their nominal positions. For example, when the invention is applied to the source array of FIG. 1(a), the subset of m sources may be the sources deployed on the left hand sub-array, at source positions A13-18. (Alternatively, the subset of m sources of the array may be taken to be the sources deployed on the central sub-array at source positions A7-12 or the sources deployed on the right hand sub-array at source positions A1-6).

The invention also assumes that, for each of the m selected sources, the distance between a near-field sensor and its associated source is known. This distance will be known if the near-field sensors are rigidly mounted with respect to the sources, but in many cases will also be known even where the near-field sensors associated with the m sources are not rigidly mounted with respect to their respective sources. In the TRISOR/CMS system, for example, the airguns are suspended in chains below the hydrophones. The airguns are quite heavy, so each airgun remains at a substantially constant distance from its associated hydrophone.

The method of the invention, when applied to the source array of FIG. 1(a), may therefore comprise calculating notional signatures for the sources at the m source positions A13-18 on the left hand sub-array, using the wavefields sensed by the near field hydrophones at locations H13-H18. The notional signatures of the sources are calculated, for example, using the method of U.S. Pat. No. 4,476,553 or GB Patent No. 2 433 594. It is known that these determined notional signatures will be erroneous, since the near field hydrophones at locations H13-H18 will not sense only the wavefield emitted by sources at source positions A13-A18, but will also sense the wavefield emitted by any of the sources at source positions A1-A12 that were actuated to generate an output.

Figure 4B:
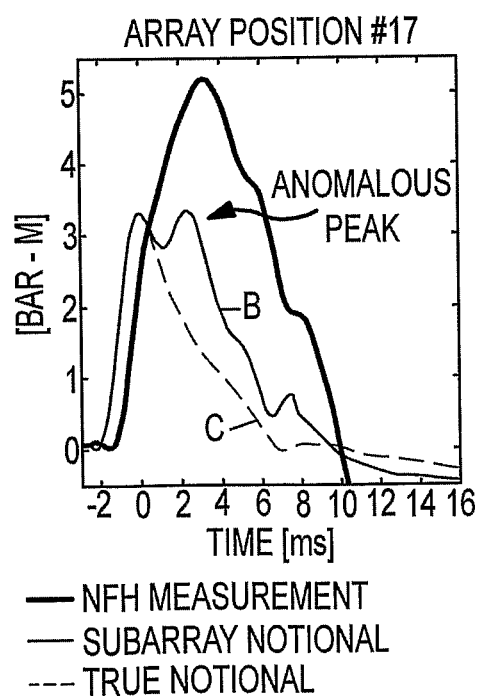
FIG. 4(b) shows near-field measurements and notional signatures for the array of FIG. 4(a)

Results of the invention are shown in FIG. 4(b). Trace (a) in FIG. 4(b) shows the wavefield sensed by the near-field hydrophone at location H17, and trace (b) shows the notional signature calculated for the source at source location A17 from the wavefield sensed by the near-field hydrophones at location H13-H18. The notional signature of trace (b) is not expected to be the true notional signature of the source, since the sources at locations A1-A12 were ignored in its calculation, and the notional signature of trace (b) will therefore be referred to as a "false" notional signature.

Trace (c) in FIG. 4(b) shows the general form of the notional signature that would be expected for the source at source location A17. The type of source is known—in this example an airgun—and trace (c) shows the general form of the notional signature that would be expected for an airgun (scaled so that its peak matches the initial peak in trace (b))— in which the magnitude of the pressure wavefield decreases after an initial peak. It can be seen that the false notional signature calculated for the source at source location A17, shown in trace (b), contains an anomalous peak that occurs after approximately 2.5 ms (time t=0 in FIG. 4(b) represents the aim point time for the airgun firing, which is the time at which it is hoped that the peak output of the airgun occurs—in a seismic survey, an airgun is triggered such that its peak output should occur at the "aim point time"). This anomaly is the superposition of the primary peak of adjacent sources that are not part of subset of the sources at positions A13-A18 and that were ignored in the calculation of the notional signature, i.e. the primary peaks of sources at positions A7-A12 on the neighbouring sub-array (as the sources at positions A1 to A6 are further away and so their effect can be ignored). Typically, the anomaly in the false notional signature for source location A17 is dominated by the primary peaks of sources at source positions A10, A11 and A12, as these are closest to source position A17 except in the case of severe perturbation of the array.

In one embodiment of the invention, information about the source positions may be obtained from inspection of the false notional signature to identify an anomalous feature and determine the time at which it occurs. The time at which the anomalous event occurs represents the travel time of seismic (acoustic) energy from a source outside the subset of m sources, and knowledge of the velocity of acoustic energy allows this time to be converted into a distance.

Once information about the positions of the sources of the array has been obtained, notional signatures for the n sources of the array may be determined using the measurements made at the n near field sensors. These notional signatures are expected to be good approximations to the correct notional signatures of the sources, and will be referred to as "true" notional signatures.

Alternatively, if position information from an external position determination system is also available, this may be combined with the information obtained by the method of the invention. The notional signatures for the n sources of the array may be determined using the combined position information.

In another embodiment of the invention, information about the source positions may be obtained in a geometry search scheme; in which a library of true notional source signatures are used to calculate a synthetic false notional signature corresponding to an estimate of the source geometry. This is repeated for further estimates of the source geometry. The locations of the sources of the array may be estimated by finding which of the synthetic false notional signatures best matches the false notional signature determined from the near-field measurements, or by finding an array geometry for which the synthetic false notional signatures are acceptable matches to the false notional signatures determined from the near-field measurements. In this embodiment, the search through the library may be made more efficient by using any available knowledge of the relative positions of the sources and near field sensors to constrain the search. This information may be available from, for example, an external positioning system or from knowledge of the construction of the array.

Given a known array geometry for a source array, such as that shown in FIG. 1(a) for example, it is straightforward to calculate the wavefield that would be sensed at each near-field hydrophone when the sources of the array are actuated simultaneously using the true notional signatures for the sources contained in the library. The false notional signatures for a subset of m of the sources, for this known array geometry, may then be calculated from the wavefield sensed by the m near-field hydrophones associated with the m sources of the subset of sources. (This is known as "forward modelling" using the library of true notional signatures of the sources.) This process may be repeated for a number of different array geometries for the source array—so as to calculate the expected signals sensed by the near-field sensor for each different array geometry and thus calculate the false notional signatures that would be expected for that array geometry. This may be continued until an array geometry is found for which the calculated false notional signatures of the m sources of the subset match the measured notional signatures of the m sources of the subset to within an acceptable level or which minimises the difference.

This forward modelling scheme described above can be used in a geometry search algorithm, where either the differences between the synthetic nearfield pressure measurement and the real nearfield pressure measurement are minimized, or alternatively, where the differences of the respective false notional source signatures are minimized. The latter comparison is preferred, as the signals propagating from the sources excluded in the notional source calculations are more pronounced in the false notional signature than the corresponding nearfield hydrophone measurement.

The sets of positions of the seismic sources used to calculate the synthetic near-field signals may be chosen using any suitable method. For example, each set of positions may be obtained by perturbing to the nominal source geometry. The perturbations that are used may for example be chosen randomly, or they may be chosen according to some systematic method. As an example of a systematic method, the relative positions of the sub-arrays of the source array of FIG. 1(a) or 4(a) may be characterised by six parameters (ignoring variations in depth)—the angle between the left sub-array and the central sub-array, the angle between the right sub-array and the central sub-array, a lateral spacing between the midpoint of the left sub-array and the midpoint of the central sub-array, a lateral spacing between the midpoint of the right sub-array and the midpoint of the central sub-array, a longitudinal spacing between the midpoint of the left sub-array and the midpoint of the central sub-array, and a longitudinal spacing between the midpoint of the right sub-array and the midpoint of the central sub-array. Ranges may be defined for each of these parameters, and the process of calculating the false notional signatures using the library of true notional signatures for the sources may be carried out by stepping each parameter through its respective range and calculating the false notional signature for one or more of the sources for each set of the parameters.

Once the actual array geometry has been determined, whether by inspection of the false notional signature or by a geometry search method, the true notional signatures for all n sources of the array may be calculated from the measurements made by all n of the near-field sensors (for example according to the method of U.S. Pat. No. 4,476,553 or GB Patent No. 2 433 594).

The present invention thus enables the notional signatures of the sources of the array to be obtained without the need for an external position measuring system for determining the positions of the sources of the source array, while still allowing simultaneous actuations of the sources.

Figure 6:
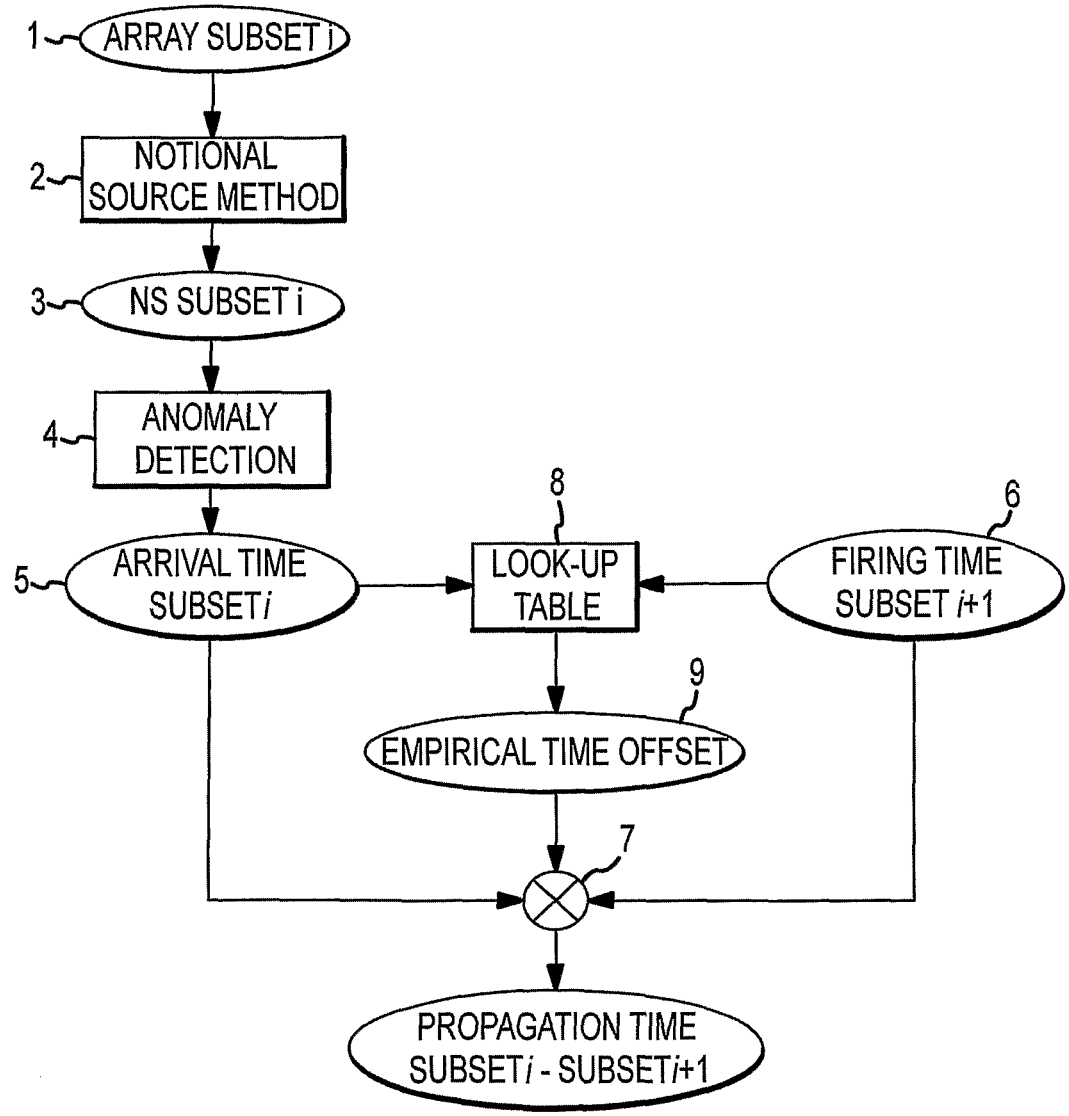
FIG. 6 is a block schematic flow diagram showing principal steps of a method according to one embodiment of the present invention.

FIG. 6 is a block flow diagram showing the principal steps of a method of the present invention. This method relates to inspection of false notional signatures. It is assumed that a seismic source array, for example the source array of FIG. 1(a) has been actuated so that the sources of the array simultaneously emit a seismic wavefield, and that data have been acquired by near-field sensors at n independent locations (where the source array contains n sources), and that seismic data have also been acquired by a receiver array.

The method may include the step of actuating the seismic source array so that the sources of the array simultaneously or substantially simultaneously emit a seismic wavefield, sensing the emitted wavefields using the near-field sensors, and also acquiring seismic data at a receiver array. Alternatively, the method may be performed on pre-existing data, in which case the method would initially comprise retrieving the pre-existing data from storage.

Although triggering all sources to fire simultaneously, also known as peak tuning of the array, is today by far the most commonly used method of firing the source array, this invention can be used to address any case in which a near field sensor receives overlapping signals from two or more sources, and is not limited to exact simultaneous actuation of the sources. Time delays between actuation of sources may be applied in a seismic survey, for example to apply firing delays for beam-steering the source array, bubble-tuning (time-aligning the bubble peaks of signatures of different sources, rather than the primary peak), etc. The invention can in principle be used with all of these applications, provided that they time delays are sufficiently small that wavefields from two or more sources are overlapping at the near-field sensors. The key is to identify subsets of sources with internal geometry that is know (either exactly or with good reliability), and then identify the first anomalous event in the false notional signature for one or more sources in one such subset. The propagation time to the closest excluded source can be found by relating the time of the event to the firing time of the excluded source.

The nominal geometry (ie, the design geometry) of the source array is known.

It will be assumed in the following description that all sources of the source array are actuated to emit seismic energy when the source array is actuated. The invention does not however require this—as is known, the shot pattern of a source array may be varied by selectively actuating some but not all of the sources of the array. In the broadest terms, therefore, n sources of an array that has a total of p sources, where n≤p, are actuated and where the signals from the p sources are overlapping in the nearfield sensor measurements (it is generally sufficient to assume over-lapping signals only for some of the near-field sensors although, in practice, the signals will be overlapping for all sensors provided the record length is sufficiently great).

Initially, at step 1, a subset of the sources is defined. The m (where m<n) sources in the subset are chosen as sources for which it can be assumed, with reasonable certainty, that their relative distances correspond to the relative distances between their nominal positions. The subset may, for example, comprise sources that belong to one sub-array of the seismic source array, since in many cases it is likely that the relative positions of the sources and their associated near-field hydrophones in one of the sub-arrays will be close to their nominal positions even if the position and/or orientation of the sub-array, relative to the other sub-arrays, has been perturbed significantly.

The subset defined at step 1 will be referred to as the ith subset.

In the example of FIGS. 4(a) and 4(b), step 1 may consist of defining the sources at positions A13-A18 as the ith subset. These sources are deployed on the same sub-array as one another, and so it is likely that any perturbations in their relative positions will be much less than perturbations in the positions of the sources at positions A13-A18 relative to sources at positions A1-A12 which are on different sub-arrays.

At step 2, notional signatures are calculated for the m sources of the ith subset of sources, from the near field measurements made by m near field sensors associated with the sources of the ith subset. The notional signatures may be calculated by any suitable method, for example according to the method of U.S. Pat. No. 4,476,553 or GB Patent No. 2 433 594, the contents of which are hereby incorporated by reference. The result is that notional signatures for each of the m sources are obtained at step 3.

As explained above, the notional signatures are calculated on the assumption that only the m sources of the ith subset had been actuated, so that the measurements made by the m near-field sensors include only the wavefields from the m sources of the ith subset. The assumption is not correct, as the measurements made by the m near-field sensors will include the wavefields from all n sources of the source array. The notional signatures calculated at step 2 are therefore expected to be false notional signatures (i.e., are expected to be different from the true notional signatures).

At step 4, the false notional signatures obtained for one or more of the m sources of the ith subset are inspected to detect any anomalies. The most likely explanation of any anomalies is that they arise from a wavefield measured by the near-field sensors associated with the m sources of the ith subset but that was emitted by a source that is outside the ith subset of sources. Anomalies in the notional signatures for the m sources of the ith subset may therefore be used to obtain information about the travel time of seismic energy from sources outside the ith subset of sources to the near-field sensors associated with the ith subset of sources and hence about the distance between sources outside the ith subset of sources and the near-field sensors associated with the ith subset of sources.

In one embodiment, step 4 comprises detecting, in the false notional signature obtained for one or more of the m sources of the ith subset, the first peak that occurs after the primary pressure peak of the signature (the time of the primary pressure peak in the notional signature corresponds to the aim point time of the source). The true notional signature of an airgun is not expected to contain any well-defined peak after the primary pressure peak.

Figure 3:
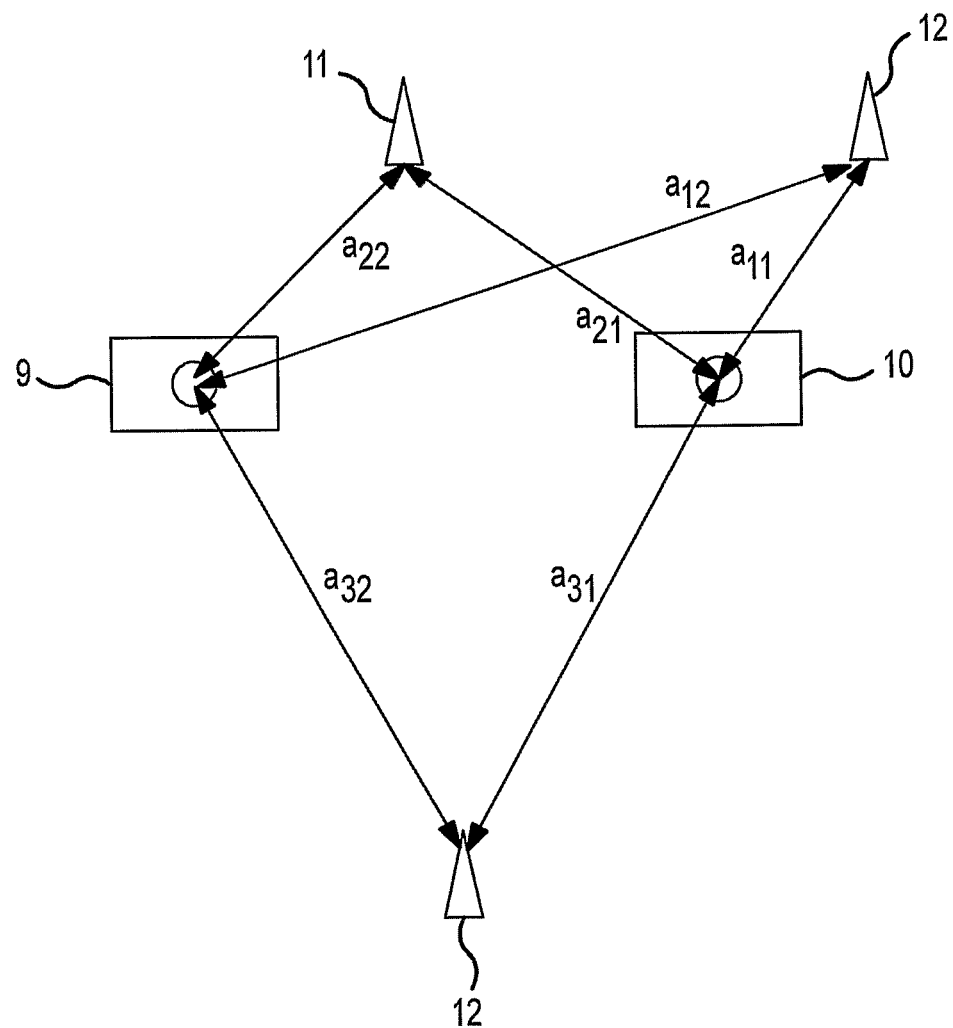
FIG. 3 illustrates determination of a notional signature for an array of seismic sources.

In the example of FIGS. 4(a) and 4(b) in which the sources at positions A13-A18 are defined as the ith subset, trace (b) of FIG. 4(b) shows the notional signature calculated for the source at position A17 and trace (c) of FIG. 4(b) shows the notional signature expected for the source at position A17. It can be seen that the notional signature calculated for the source at position A17 differs significantly from the expected signature, and in particular contains an "anomalous peak" as labelled in FIG. 3(b). The most likely explanation for this signature anomaly is that it is the superposition of the primary peak of adjacent sources that are not part of subset A13-A18—and most probably sources at positions A7-A12 (since these are closer than sources at positions A1-A6) and these sources with be denoted as the (i+1)th subset. In the specific case of the source at position A17, a signature anomaly is typically dominated by the primary peaks of sources at positions A10, A11 and A12, since these are closest to position A17 (unless the array has been seriously perturbed from its nominal position, in which case acquisition of data may well be halted until the array is repaired).

The method of the invention may use any anomalous features identified at step 4 to obtain information about the positions of sources outside the ith subset of sources relative to the near-field sensors associated with the ith subset of sources. As noted above, it can generally be assumed that the near-field sensors associated with the m sources of the ith subset of sources are at their nominal separation relative to the m sources, so that the method provides information about positions of sources outside the ith subset of sources relative to the sources of the ith subset of sources. FIG. 6 illustrates one method in which information about the positions of sources outside the ith subset may be obtained.

The primary pressure peaks as measured by near-field hydrophones have a rise time of approximately 2 ms, and it is difficult to identify individual peaks separated by less than half of this rise time, that is separated in time by 1 ms or less. Consequently, for conventional source arrays, the method will not be able to separate the pressure peaks from individual airguns that have a propagation time difference of less than 1 ms—which corresponds to a path difference of less than approximately 1.5 m. In the example of the notional signature of the source at position A17, the anomalous peak in the notional signature is likely to contain contributions from the closest excluded sources, with the greatest contributions being from the sources at positions A10, A11 and A12. However, in a conventional array the difference in propagation time from source A10, A11 and A12 is likely to be less than 1 ms so that the contributions to the notional signature of the source at position A17 from the individual sources at positions A10, A11, A12 are not resolved and only one anomalous peak is seen (as shown in FIG. 4(b)). In other words, the anomalous peak identified in the notional signature is generally the superposition of primary pressure peaks from more than one of the other n-m sources. However, for analysis, it will be assumed that the anomalous peak arises from the closest source (based on the nominal array geometry) of the other n-m sources—so that, in the example of the notional signature of the source at position A17 it will be assumed that the anomalous peak arises from the source at position A11.

In one embodiment, the propagation time to a source, from the closest source of the other n-m sources, may be estimated as the difference between the aim-time of the closest source of the other n-m sources (ie, the time at which the closest source of the other n-m sources produces its peak output) and the time at which the anomalous peak occurs in the notional signature of the source. In the example of the notional signature of the source at position A17, therefore, one estimate of the propagation time between the source at position A11 and the near-field receiver associated with source at position A17 would be the difference between the aim point time of the source at position A11 and the time at which the anomalous peak occur in the notional signature of the source at position A17.

This embodiment is illustrated in FIG. 6. The aim point time of the closest source of the (i+1)th subset (eg the source at position A11) is subtracted from the arrival time 5 of the seismic energy at a source in the ith subset (eg the source at position A17), as determined from the anomalous peak in the notional signature for that source is combined, at step 7, to obtain the propagation time.

While determining the propagation time as the time difference between the anomalous peak in the false notional signature of the ith subset and the aim point time 6 of the closest source of the (i+1)th subset is straightforward, it is however liable to give incorrect results for two reasons. Firstly, while a source is triggered with the intention of producing peak output at the aim point time, the time delay between sending the triggering pulse to a source and the actual firing of the source depends on the mechanical properties of the source—so, in practice, a source may not be fired at the correct time to give peak output at the aim point time (although current firing controllers, such as the TRISOR controller of WesternGeco™, attempt to correct for these triggering delays using predictive filtering techniques). The difference between the aim point time of a source and the actual time at which the source provides peak output is known as the "synchronisation error" of the source, and any synchronisation error between the source of the ith sub-array for which the notional signature is calculated and the closest source of the (i+1)th sub-array will mean that the propagation time as determined by the simple subtraction is incorrect. Secondly, the fact that an anomalous peak in a notional signature is generally the superposition of energy received from two or more sources can also mean that the propagation time as determined by the simple subtraction is incorrect, since the time at which the anomalous event has its peak may not correspond exactly to the arrival of the peak wavefield from the closest source of the (i+1)th sub-array.

In a preferred embodiment, therefore, the propagation time ($t_{propagation}$) is determined according to:

$$t_{propagation} = t_{event} - t_{aim} - t_{offset} \quad (1)$$

where $t_{event}$ is the time at which the anomalous peak in the notional signature occurs, $t_{aim}$ is the aim point time of the closest source of the (i+1)th sub-array, and $t_{offset}$ is an offset time that corrects for synchronisation errors between the source of the ith sub-array for which the notional signature is calculated and the closest source of the (i+1)th sub-array and/or errors arising from the superposition of energy from two or more sources of the (i+1)th sub-array in the anomalous peak.

Alternatively, if the actual time $t_{peak}$ at which the closest source of the (i+1)th sub-array produced its peak output is known, the propagation time ($t_{propagation}$) may be determined according to:

$$t_{propagation} = t_{event} - t_{peak} - t_{offset} \quad (1a)$$

In equation (1a), $t_{offset}$ is required to correct only for errors arising from the superposition of energy from two or more sources of the (i+1)th sub-array in the anomalous peak, as the use of the actual time $t_{peak}$ at which the closest source of the (i+1)th sub-array produced its peak output, rather than the intended aim point time of the source, has eliminated synchronisation errors.

In a particular embodiment, the correction $t_{offset}$ that is used in equation (1a) is an "empirical offset" that compensates for the superposed nature of the anomalous peak. These empirical offsets may be derived from information about the relative peak amplitude, and firing times, of the sources in the (i+1)th sub-array. The effectiveness of these empirical offsets is due to the high repeatability of the primary pressure peak waveforms from the sources. Moreover, these empirical offsets have been found to be constant over a large range of cross-line distances, owing to the near-constant slope at which the true notional source signature decays from its primary peak.

In this embodiment, data adaptive offsets can be found through forward modelling of library notional signatures for the individual sources of the array, using the repeatability of the notional source peak waveform. The modelling also takes account of any synchronisation errors, as each combination of synchronisation errors will give rise to a different set of empirical offsets.

In this embodiment, the offsets $t_{offset}$ may be pre-calculated for a range of likely synchronisation errors and stored. The method is accordingly effected by querying a look-up table (step 8 in FIG. 6) to determine the appropriate $t_{offset}$ (step 9). First the synchronization error for the shot is retrieved, to give information about the relative delays in firing time of the sources that are most likely to be contributing to the anomalous event peak. For example, for the event peak in the false notional signature of the source at position A17, the relative firing time of source A17 to sources A7 to A12 is used to find an empirical value to adjust the estimate of propagation time between source A11 and the near-field sensor associated with source A17. It has been found that these empirical time-offsets are small; typically less than ±0.2 milliseconds. However, 0.2 ms corresponds to a distance of 30 centimeters, which might be significant for some applications.

In this embodiment, step 7 then comprises determining the propagation time according to equation (1a), with $t_{offset}$ being the empirical offset determined at step 9.

The propagation time between the source for which the notional signature was calculated and the closest source of the (i+1)th sub-array (or, more precisely, between the near-field receiver associated with the source for which the notional signature was calculated and the closest source of the (i+1)th sub-array) may then be converted into a distance, using the velocity of propagation of seismic energy.

Step—7 may then be repeated for all sources in the ith subset, to determine the propagation time to that source from the closest source of the (i+1)th sub-array. If the calculation of the propagation uses the empirical offset of equation 1(a), the appropriate offset to be applied is obtained by querying the look-up table. Each of these propagation times is then converted to a distance.

It will therefore be seen that the results of the method of FIG. 6 are, for each source of the ith sub-array, the distance to the closest source of the (i+1)th sub-array.

The results may then be used to estimate the positions of the sources relative to one another. For example, a triangulation process may be used to estimate the positions of sources relative to one another. If the distance between the source at position A11 and the source at position A17 and the distance between the source at position A11 and the source at position A18 are estimated a triangulation may be used since the distance between the source at position A17 and the source at position A18 is assumed to be equal to its nominal value.

The method may then be repeated by defining a new subset of sources. In the case of the source array shown in FIG. 4(*a*), a new subset containing, for example, the sources at positions A1 to A6 may be defined. The method of FIG. 6 may be repeated for the new subset, for example to obtain information about the propagation times from sources at positions A7 to A12 to sources at positions A1 to A6 by calculating false notional signatures for the sources at positions A1 to A6 using the wavefields sensed by their associated near-field sensors and identifying anomalies in these notional signatures as described above. This makes it possible to obtain information about the positions of the sources in the new subset relative to other sources of the array.

Depending on the geometry of the source array, it may be possible to carry out further repetitions of defining another subset of the sources and obtaining information about the positions of the sources in that subset relative to other sources of the array.

In principle, information about the positions of the sources at positions A7 to A12 relative to sources at positions A1 to A6 may be obtained by calculating false notional signatures for the sources at positions A7 to A12 using the wavefields sensed by their associated near-field sensors and identifying anomalies in these false notional signatures. While anomalies in the false notional signatures sources for the sources at positions A7 to A12 may arise from the sources at positions A13 to A18 as well as from sources at positions A1 to A6, since the positions of the sources at positions A7 to A12 relative to the sources at positions A13 to A18 are now know, the effects arising from the sources at positions A13 to A18 can now be calculated and corrected for.

In a further embodiment, information about the positions of the sources at positions A7 to A12 relative to sources at positions A1 to A6 may be obtained using a recursive method. In the first stage of this method, false notional signatures are calculated for the sources at positions A13 to A18 using the wavefields sensed by their associated near-field sensors. Information about the positions of sources at source positions A7 to A12, relative to the positions of sources at source positions A13 to A18, may then be found from anomalies in the false notional signatures, as described above.

In the second stage, false notional signatures are calculated for the sources at positions A7 to A18 using the wavefields sensed by their associated near-field sensors. This is possible because information about the positions of sources at source positions A7 to A12 relative to the positions of sources at source positions A13 to A18 was obtained in the first stage. Information about the positions of sources at source positions A1 to A6, relative to the positions of sources at source positions A7 to A12, may then be found from anomalies in the false notional signatures for sources at positions A7 to A12, using the method described above. Since the false notional signatures in this stage were calculated using the wavefields sensed by the near-field sensors associated with sources A7 to A18, the effect of the wavefields from sources A13 to A18 on the notional signatures has already been taken into account when the false notional signatures were calculated, and any anomalies in the false notional signatures for sources at positions A7 to A12 arise from sources at positions A1 to A6. (In principle, the false notional signatures calculated for sources A13 to A18 will also contain anomalies arising from false notional signatures sources at source positions A1 to A6, but these will be less pronounced owing to the greater separation between source positions A1 to A6 and source positions A13 to A18.)

This recursive method may readily be extended to the case of an array having four or more sub-arrays. In the case of an array having four sub-arrays, the next stage would be to calculate false notional signatures for the sources of the first, second and third sub-arrays, using the wavefields sensed by the near-field sensors associated with the sources of the first, second and third sub-arrays. Information about the relative position of sources in a fourth sub-array may be obtained from anomalies in the notional signatures for the sources of the third sub-array.

Once information about the positions of all sources of the array has been obtained, the true notional signatures of the sources may be calculated according to any desired method, using the measurements made by the n near field sensors.

Figure 7:
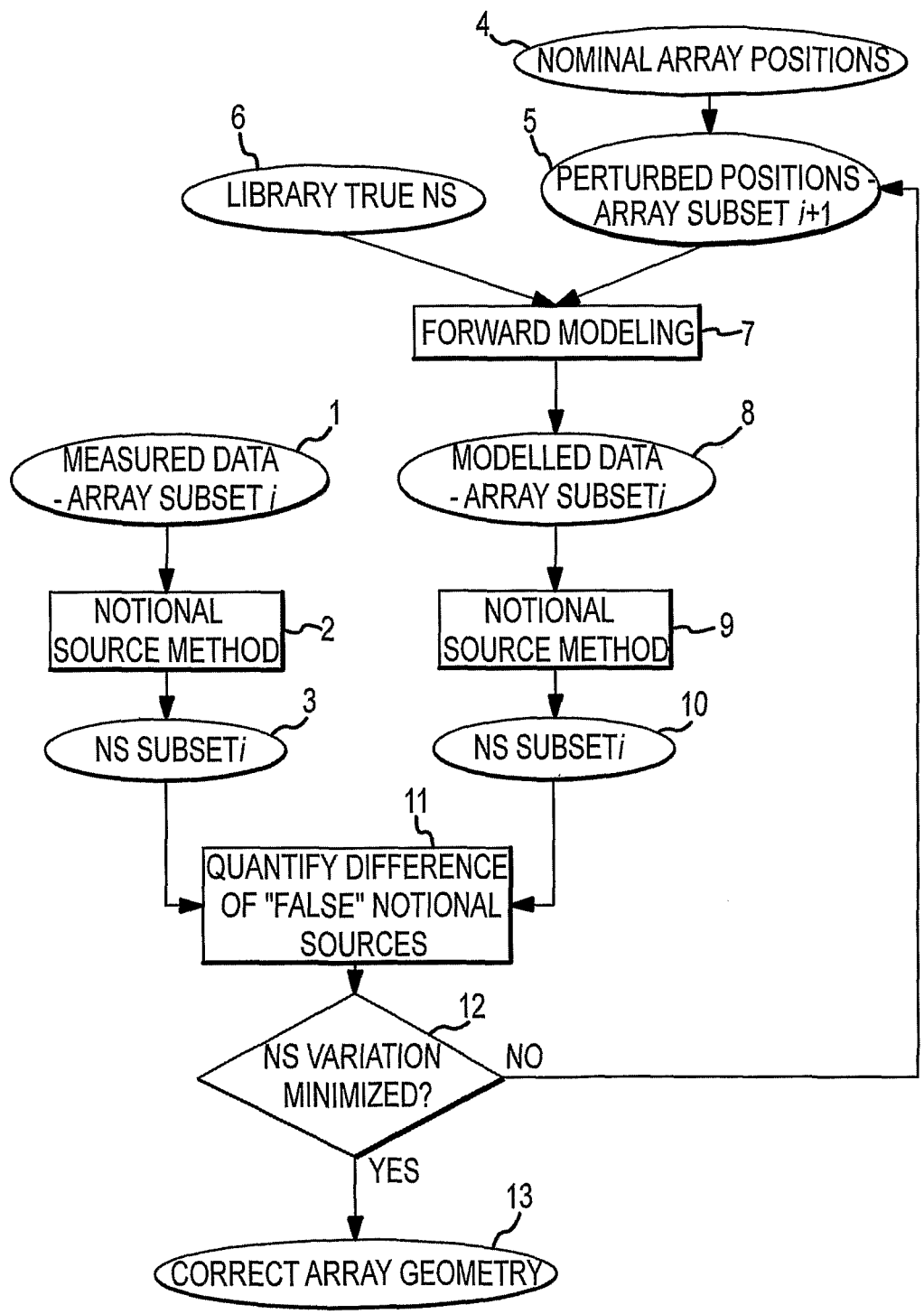
FIG. 7 is a block schematic flow diagram showing principal steps of a method according to another embodiment of the present invention.

As noted above, if position information from an external position determination system is also available, this may be combined with the information obtained by the method of the invention (not shown in FIG. 7). The notional signatures for the n sources of the array may be determined using the combined position information.

The seismic data acquired by the receiver array consequent to actuation of the source may now be processed, for example to obtain information about one or more parameters of the earth's interior. The calculated notional signatures of the sources may be used in the processing of the seismic data. For example, the calculated notional signatures of the sources may be used to determine the far-field signature of the source array at one or more points in the far-field region, and the far-field signature of the source array may be used in the processing of the seismic data.

The method of FIG. 6 may be performed for every actuation of the source array. Although this requires more computation, re-determining the estimates of the positions of the sources for every shot should provide the most accurate estimates of the notional signatures of the sources for every shot.

Alternatively, the method of FIG. 6 may be performed at intervals, for example after every m actuations of the source array. This reduces the computation required, while allowing the estimates of the positions of the sources to be up-dated. This may be done, for example, in calm sea conditions, where there is likely to be little relative movement between the sub-arrays.

FIG. 7 is a schematic flow diagram of a method according to another embodiment of the invention. This method involves comparing the false notional signatures calculated for sources in a subset with false notional signatures calculated for different array geometries.

Steps 1, 2 and 3 of the method of FIG. 7 correspond generally to steps 1, 2 and 3 respectively of FIG. 6, and their description will not be repeated. They lead to "false" notional signatures for the sources of the ith subset.

In this method, the false notional signatures obtained in step 3 are compared with false notional signatures that are modelled for different array geometries. The notional signatures are modelled using a library of true notional signatures for the sources of the array and an estimate of the actual array geometry. Thus, the method of FIG. 7 comprises determination of an initial estimate of the array geometry; this is shown in FIG. 7 as comprising applying a perturbation at step 5 to the nominal array geometry as input at step 4, but the method is not limited to this particular method of determining an estimate of the array geometry.

At step 6 the true notional signatures of the sources are retrieved from the library, and at step 7 the emitted wavefield of the source array is modelled using the array geometry estimated at step 5 and the true notional signatures retrieved from the library. The result of the forward modelling step is, at step 8, the modelled wavefield incident on each of the near-field sensors associated with the sources of the ith subset of the array.

At step 9, the notional source method is applied to the sources and near-field receivers of the ith subset of the array, to calculate notional signatures of the sources of the ith subset from the wavefields sensed by their associated near-field sensors. This step is carried out in a similar manner to step 2, in that the sources that do not belong to the ith subset are ignored in the determination of the notional signatures of the sources of the ith subset, even though the wavefield incident on the near-field receivers of the ith subset of the array includes components emitted by sources that do not belong to the ith subset. Step 9 thus results in, at step 10, synthetic false notional signatures for the sources of the ith subset—modelled for the particular estimate of the source geometry made at step 5.

The false notional signature obtained in step 3 for one or more of the sources of the ith subset is then compared with the synthetic false notional signature obtained for that source in step 10. This provides an indication of how accurate is the initial estimate of the source geometry made at step 5—if the estimate of the source geometry made at step 5 corresponds to the true source geometry, the synthetic false notional signatures obtained in step 10 should be the same as the false notional signatures obtained in step 3. Any discrepancy between a synthetic false notional signature obtained in step 10 and the corresponding false notional signature obtained in step 3 indicates that the estimate of the source geometry used in the modelling was incorrect.

Comparing the notional signatures may, for example comprise quantifying the difference between the synthetic false notional signature obtained in step 10 for one or more of the sources of the ith subset and the corresponding false notional signature obtained in step 3 (at step 11), and determining whether the quantified difference is below a predetermined threshold (step 12). A determination at step 12 that the difference is below the threshold would indicate that the estimate of the source geometry used at step 5 is an acceptable estimate of the current source geometry. However, a determination that the difference exceeds the threshold indicates that the estimate of the source geometry used at step 5 is not an acceptable estimate of the current source geometry. In this case, steps 5-12 are repeated for a different estimate for the source geometry, and this repetition is continued until a source geometry is tried that gives a "yes" determination at step 12. This estimate of the source geometry may be taken to be an accurate estimate of the true source geometry (step 13).

Step 12 may, for example, be carried out by determining the root mean square (RMS) value of the difference between a synthetic false notional signature obtained in step 11 and the corresponding false notional signature obtained in step 3. It has been found that minimising the RMS value of the difference between the synthetic false notional signature and the corresponding false notional signature is a reliable way of estimating the true source geometry.

Alternatively, a source geometry that minimises the difference between the synthetic false notional signature and the corresponding false notional signature may be found. In this modified embodiment, step 12 of FIG. 7 would be replaced by the step of checking whether or not the difference between the synthetic false notional signature for the current estimate of the source geometry and the corresponding false notional signature was less than the difference between the synthetic false notional signature obtained for an earlier estimate of the source array geometry and the corresponding false notional signature; the estimate of the source geometry that gives the lower difference is retained. This process is repeated until the source geometry that gives the synthetic false notional signature that is least different from the corresponding false notional signature is found.

In many cases it may be possible to place constraints on the possible array geometry. As an example, if the source array is provided with an external positioning system, the results from this may place one or more constraints on the relative positions of sources of the array. These constraints may be taken account of at step 5 of the method of FIG. 7, by ensuring that any trial array geometry selected at step 5 satisfies the constraint(s). This reduces the number of possible array geometries that must be tried, and so reduces the computation required. In the case of an array having the nominal array geometry of FIG. 5, for example, an external positioning system may provide information about the compass headings along which each of the three sub-arrays extend. This information may be used as constraints when trial array geometries are selected at step 5, and any array geometry that does not match (at least approximately) the headings need not be considered.

The physical construction of the array may also provide one or more constraints on the likely array geometry that can be used to restrict the number of possible array geometries. For example the magnitude of the distance between two sources of a sub-array may be fixed if the two sources are rigidly connected, or alternatively may be constrained not to exceed a certain value. Any such constraints on the array geometry arising from the physical construction of the array may also be taken account of in selecting a trial array geometry at step 5.

Once the source geometry has been estimated, the method of FIG. 7 may then be continued in the same manner as the method of FIG. 6. The notional signatures of the sources of the array may be estimated using the estimate of the source geometry obtained at step 13 (if information about the source geometry is available from an external positioning system this may be combined with the estimate of the source geometry obtained at step 13, to further increase the accuracy of the estimate), and obtained seismic data may be processed using these notional signatures to obtain information about the earth's interior.

Additionally and/or alternatively, step 1 may be repeated to define an (i+1)th subset of the sources, and steps 2, 3, 9, 10, 11, 12 and 13 may be repeated for the (i+1)th subset. If desired, these steps may be repeated for further subsets of the sources. Indeed, in practice it will generally be preferable to repeat the steps for all subsets of the sources (for which the relative positions of the sources within the subsets are unlikely to be significantly perturbed from their nominal positions), because the false notional source signature is most sensitive to positioning errors of the neighbouring subset—so to utilize this sensitivity it is necessary to perform the comparison on as many subsets/subarrays as possible. However, the array geometry perturbation may be performed on all subsets/subarrays simultaneously, rather than sequentially, as this probably results in fewer iterations in total being required.

The invention may also be carried out using a library of false notional signatures pre-calculated for different perturbed array geometries, by comparing an obtained false notional signature with the library of pre-calculated false notional signatures to determine the array geometry. However, this method would require a huge signature library, as the false notional signatures would have to be calculated for every conceivable combination of perturbations to the array geometry and synchronisation errors, and so is likely in practice to be time-consuming to carry out with current computers.

However, it may be possible to reduce the computation required to make this method more practicable. For example, once the synchronization errors have been determined, they can be removed from the search through the library of false notional signatures for as long as they are thought to be time invariant. How many possible array geometries are required for storage depends on how much accuracy is needed, and on how much variation from the nominal array geometry is realistic. Also, intelligent search algorithms could be very useful in this problem.

Furthermore it may not be necessary to compare an obtained false notional signature with every false notional signature in the library. As explained above it may be possible to place one or more constraints on the perturbed array geometry, for example if results from an external position measuring system are available—in such a case the obtained false notional signature need be compared only with false notional signatures in the library that correspond to perturbed array geometries that satisfy the constrain(s).

Also, as mentioned above, the determination of relative positions of the sources of the array does not need to be carried out in real time.

Figure 8:
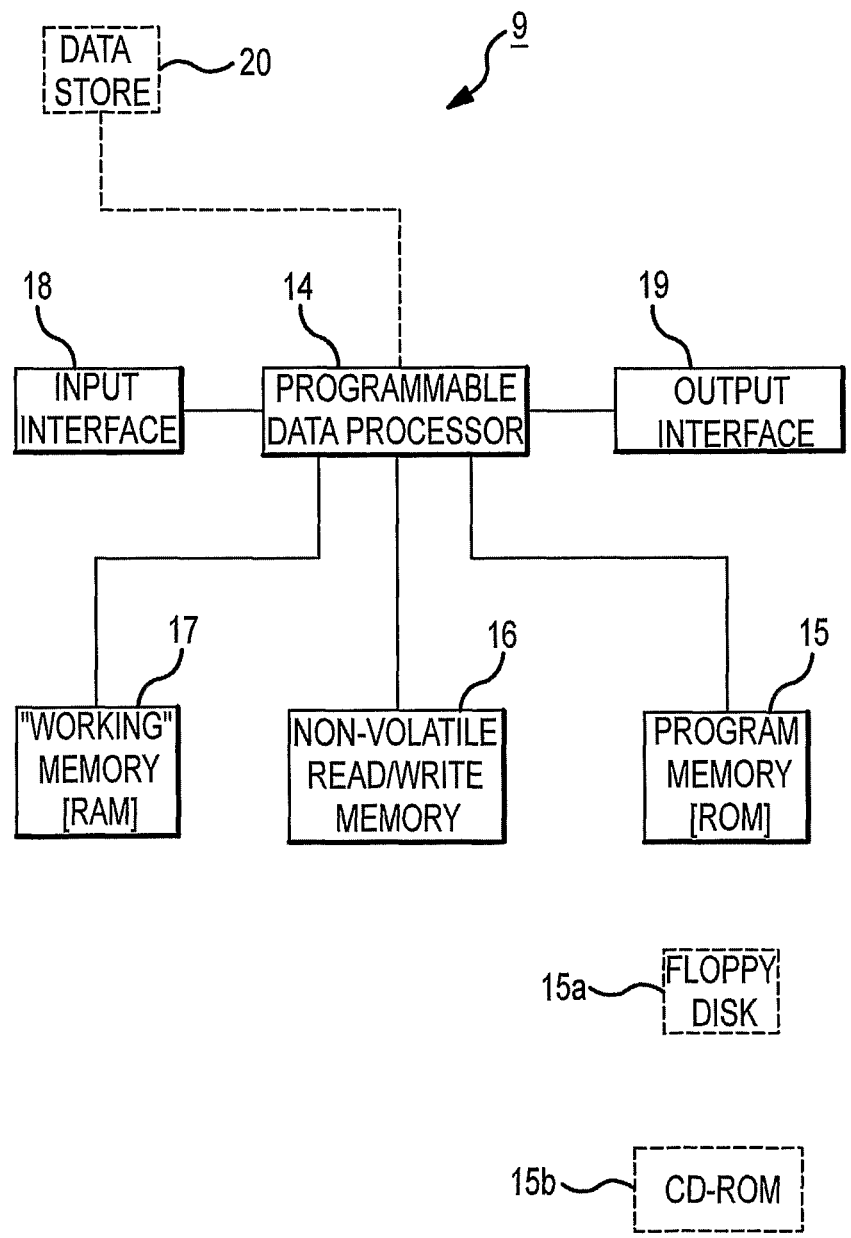
FIG. 8 is a schematic block diagram of an apparatus of the present invention.

FIG. 8 is a schematic block diagram of a programmable apparatus 13 according to the present invention. The apparatus comprises a programmable data processor 14 with a program memory 15, for instance in the form of a read-only memory (ROM), storing a program for controlling the data processor 14 to perform any of the processing methods described above. The apparatus further comprises non-volatile read/write memory 16 for storing, for example, any data which must be retained in the absence of power supply. A "working" or scratch pad memory for the data processor is provided by a random access memory (RAM) 17. An input interface 18 is provided, for instance for receiving commands and data. An output interface 19 is provided, for instance for displaying information relating to the progress and result of the method. Seismic data for processing may be supplied via the input interface 19, or may alternatively be retrieved from a machine-readable data store 20.

The program for operating the system and for performing a method as described hereinbefore is stored in the program memory 15, which may be embodied as a semi-conductor memory, for instance of the well-known ROM type. However, the program may be stored in any other suitable storage medium, such as magnetic data carrier 15a, such as a "floppy disk" or CD-ROM 15b.

The invention has been described with reference to a marine source array in which the sources are airguns. The invention is not however limited to this, and may be applied to other source arrays, provided that the sources create an anomaly in the false notional signature that may easily be detected.

The invention has also been described with reference to a "peak tuned" source array in which it is intended that all sources have the same aim point time. The invention is not limited to this however, and may be applied to source arrays in which the sources are fired with a short delay (for example to obtain "beamsteering"), provided that the resultant shot pattern still results in overlapping signals at the near-field sensor positions.

The invention claimed is:

1. A method of obtaining information about positions of seismic sources in a marine seismic source array, the method comprising:
   determining respective notional signatures for m selected seismic sources, wherein m<n, and n is a number of the seismic sources in the seismic source array actuated to generate an output;
   obtaining information about a travel time between one of the m selected seismic sources and one of n−m unselected seismic sources from the determined notional signatures, wherein obtaining information about the travel time between the one of the m selected seismic sources and the one of the n−m unselected seismic sources from the determined notional signatures comprises identifying an anomalous feature in the notional signature of the one of the m selected seismic sources and the travel time comprises a time interval between actuating the one of the n−m unselected seismic sources and generating the anomalous feature in the notional signature for the one of the m selected seismic sources; and
   using the travel time to determine a distance between the one of the m selected seismic sources and the one of the n−m unselected seismic sources.

2. A method as claimed in claim 1 and further comprising:
   actuating the n seismic sources of the array to generate the output; and
   measuring a pressure field at n independent locations, wherein calculating the notional signatures for the m sources comprises calculating the notional signatures from the measured pressure field value obtained at m locations.

3. A method as claimed in claim 1 wherein identifying the anomalous feature comprises identifying a first anomalous feature to occur in the notional signature after a primary pressure peak.

4. A method as claimed in claim 1 further comprising:
   comparing the notional signatures calculated for one or more of the m sources with an expected notional signature.

5. A method as claimed in claim 1 further comprising: determining:

$$t_{propagation} = t_{event} - t_{aim} - t_{offset} \quad (1)$$

where $t_{event}$ is a time at which the anomalous feature occurs in the notional signature for the one of the m selected seismic sources, $t_{aim}$ is an aim point time of the one of the n−m unselected seismic sources, and $t_{offset}$ is an offset time.

6. A method as claimed in claim 1 further comprising: determining:

$$t_{propagation} = t_{event} - t_{peak} - t_{offset} \quad (1a)$$

where $t_{event}$ is a time at which the anomalous feature occurs in the notional signature for the one of the m selected seismic sources, occurs, $t_{peak}$ is a time at which the one of the n−m unselected seismic sources produces a peak output, and $t_{offset}$ is an offset time.

7. A method as claimed in claim 1 wherein the one of the n−m unselected seismic sources is a closest of the n−m unselected seismic sources to the one of the m selected seismic sources.

8. A method as claimed in claim 1 further comprising:
   for each of the m selected seismic sources, obtaining information about the travel time between the each of the m selected seismic sources and a respective one of the n−m unselected seismic sources from the determined notional signatures.

9. A method as claimed in claim 1 wherein obtaining information about the position of one of the m selected seismic sources relative to one of the n−m unselected seismic sources from the determined notional signatures comprises comparing the notional signatures of one or more of the m seismic sources with notional signatures calculated for an estimate of positions of the seismic sources.

10. A method as claimed in claim 9 further comprising:
    quantifying a difference between the notional signature of one of the m seismic sources and a notional signature calculated for an estimate of positions of the seismic sources.

11. A method as claimed in claim 10 further comprising: comparing the difference with a threshold.

12. A method as claimed in claim 1 further comprising:
    for each of the m selected seismic sources, obtaining information about a position of the seismic source relative to a position of a respective one of the n−m unselected seismic sources from the determined notional signatures.

13. A method as claimed in claim 1 and further comprising determining notional signatures for the n sources of the array using the distance between one of the m selected seismic sources and one of the n−m unselected seismic sources.

14. A method as claimed in claim 13, and further comprising: acquiring seismic data at one or more of the seismic receivers subsequent to generating the output at the n sources of the seismic source array; and processing the acquired seismic data to obtain information about one or more parameters of the earth's interior.

15. A method as claimed in claim 14 wherein processing the seismic data to obtain information about one or more parameters of the earth's interior comprises taking account of the determined notional signatures for the n sources of the source array.

16. A marine seismic system comprising:
    a seismic source array comprising a plurality of seismic sources and a plurality of near field hydrophones, wherein a set n of the plurality of seismic sources are configured in use to generate an output signal from the seismic source array; and a processor configured to:
- determine respective notional signatures for a selected set m of the plurality of seismic sources, wherein the selected set m is a subset of the set n of the plurality of seismic sources where m<n, and wherein the processor determines the respective notional source signatures from measurements of the output signal made by the plurality of near-field hydrophones;
- process a travel time between one of the selected set m of the plurality of seismic sources and one of an unselected set n–m of the plurality of seismic sources from the determined notional signatures by identifying an anomalous feature in the notional signature of one of the selected set m, and wherein the travel time comprises a time interval between generating the output at one of the n–m unselected seismic sources and a time when the anomalous feature in the notional signature for the one of the m selected seismic sources occurs;
- using the travel time to determine a distance between the one of the m selected seismic sources and the one of the n–m unselected seismic sources.

\* \* \* \* \*